J. A. FIESER.
HOSE COUPLING.
APPLICATION FILED MAR. 28, 1912.

1,043,683.

Patented Nov. 5, 1912.

Inventor
J. A. Fieser.

UNITED STATES PATENT OFFICE.

JACOB A. FIESER, OF LARIMER, PENNSYLVANIA.

HOSE-COUPLING.

1,043,683.   Specification of Letters Patent.   Patented Nov. 5, 1912.

Application filed March 28, 1912. Serial No. 686,923.

*To all whom it may concern:*

Be it known that I, JACOB A. FIESER, a citizen of the United States, residing at Larimer, in the county of Westmoreland and State of Pennsylvania, have invented certain new and useful Improvements in Hose-Couplings; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in swiveled couplings for hose pipes forming means whereby the different sections of the pipe may be turned to prevent twisting.

The invention consists further of other details of construction and combinations and arrangements of parts which will be hereinafter fully described, shown in the accompanying drawings and then specifically defined in the appended claim.

I illustrate my invention in the accompanying drawings, in which:—

Figure 1:
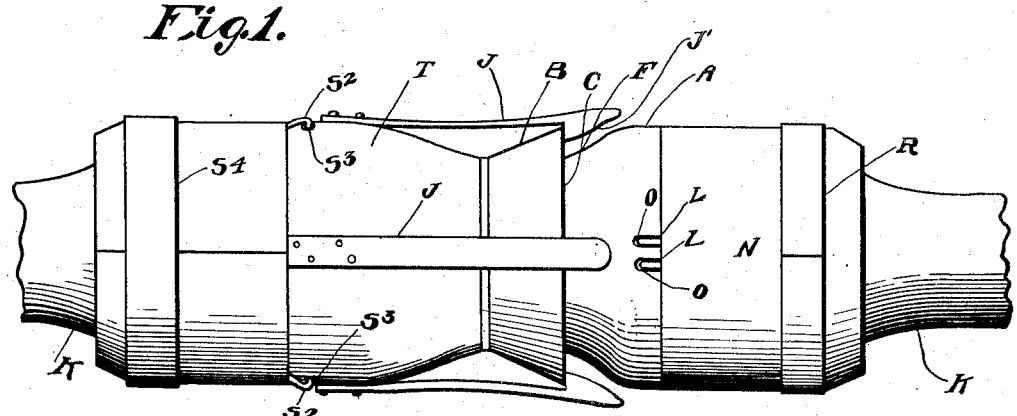
Figure 2:
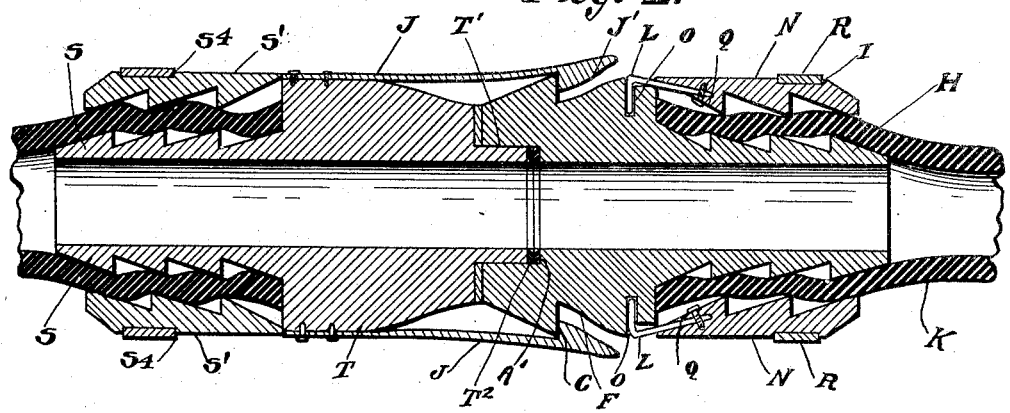
Figure 3:
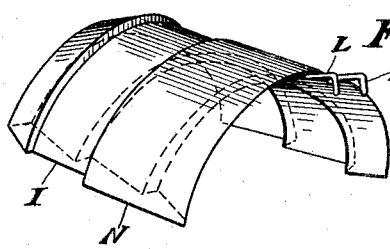

Figure 1 is a plan view of my improved coupler. Fig. 2 is a central longitudinal sectional view, and Fig. 3 is a detail view of a clamping member, forming means for holding the hose upon the coupler head.

Reference now being had to the details of the drawings by letter, A designates a coupler head provided with a tapering portion B, terminating at its inner end in a shoulder C which forms the forward edge of an annular groove F, the bottom of which is inclined. Said coupler head has a contracted shank portion H having circumferential shoulders thereon, said shank portion adapted to receive the end K of a hose pipe. The circumference of the coupler head has holes O formed therein, and N, N designate semi-cylindrical clamping plates, each having shoulders upon its inner face adapted to conform to and coöperate with the shoulders formed upon the contracted portion of the head to clamp and hold the hose pipe securely to the coupler head. The inner surface of each clamping member is beveled as at Q to receive the inner flaring end of the hose pipe, and L, L designate hooks which project from the tapering portion of the clamping member and adapted to engage said holes in the coupler head in the manner shown clearly in the drawings. It will be noted that two of said clamping members are of similar construction and each provided with hooks engaging the coupler head and the circumference of each clamping member has an annular recess I formed therein for the reception of a resilient band R adapted to hold the two clamping sections in clamping relation with the end of the hose which telescopes over the contracted portion of the coupler head. The coupling end of the head A has a chambered portion in which is positioned a washer A' and against which latter the end of the adjacent coupler head is adapted to contact.

The second coupler head is designated in the drawings by letter T and has at its coupling end a contracted extension T' which is adapted to telescope within the chambered portion of the other coupling head, and a washer T² is mounted about the inner end of said contracted extension and against which the washer within said chambered portion of the head A is adapted to contact when the two coupler heads are connected. The shank portion of the coupling head T is provided with annular shoulders S and two clamping members S', similar to those upon the coupler head A, are provided for holding a hose to the coupler head T, said clamping members being provided with hooks S² for engagement with holes S³ in the head T and a band S⁴ engages annular recesses formed in the clamping member to hold the same in engagement with the hose. Said head T is provided with a series of elongated slots formed in the circumference thereof, and J designate hooks having resilient shank portions with inclined portions J' adapted to contact with the inclined portion B of the coupler head A when the two coupler heads come together and for the purpose of spreading the hooks which, after the latter pass by the inner end of the inclined portions B, engage the shoulder upon the head A, as illustrated in the drawings.

By the provision of a coupler head made in accordance with my invention, it will be noted that sections of hose may be connected together and one section rotate independent of the other, through the medium of the swiveled connections shown, thus preventing the hose from twisting and the sections of the hose may be securely held to the shank portions of the head by the clamping members, which latter may be easily removed by simply detaching the resilient bands and the clamping members.

What I claim to be new is:—

A hose coupling comprising a coupler head having a contracted extension at its coupling end, a second coupling head recessed at its end for the reception of the contracted end of the other coupler, means for fastening the coupler heads together, portions of the circumference of said heads having serrations thereon, semi-cylindrical shells with the inner concaved surfaces serrated and forming jaws to coöperate with the serrations upon the heads to hold the ends of hose pipes upon the coupler heads, hooks fastened to said shells and projecting beyond the inner ends thereof and adapted to engage holes formed in the coupler head, as set forth.

In testimony whereof I hereunto affix my signature in the presence of two witnesses.

JACOB A. FIESER.

Witnesses:
S. E. SHEPP,
R. E. SHEPP.

Copies of this patent may be obtained for five cents each, by addressing the "Commissioner of Patents, Washington, D. C."